United States Patent [19]
Krhnak

[11] Patent Number: 5,782,168
[45] Date of Patent: Jul. 21, 1998

[54] PORTABLE GRILL

[76] Inventor: Peter S. Krhnak, 11707 Greenlane Dr., Potomac, Md. 20854

[21] Appl. No.: 906,502

[22] Filed: Aug. 5, 1997

[51] Int. Cl.⁶ .................... A47J 37/00; A47J 37/04; A47J 37/07

[52] U.S. Cl. .................... 99/340; 99/419; 99/421 H; 99/449; 99/482; 126/9 R; 126/25 R

[58] Field of Search ............... 99/339, 340, 419–421 V, 99/444–446, 447–450, 390, 391, 402, 427, 481, 482; 126/25 R, 9 R, 9 B, 25 A, 25 M, 41 R, 29, 1 R, 30, 38, 59, 37 B

[56] References Cited

U.S. PATENT DOCUMENTS

| | | | |
|---|---|---|---|
| 3,182,585 | 5/1965 | Rensch et al. | |
| 3,319,562 | 5/1967 | Turcott et al. | |
| 3,611,912 | 10/1971 | Choc | |
| 3,899,961 | 8/1975 | Tanguy | 99/340 |
| 4,120,237 | 10/1978 | Mercherlen | |
| 4,215,667 | 8/1980 | Hsu | 126/9 R |
| 4,295,034 | 10/1981 | Assmann | 99/447 X |
| 4,418,678 | 12/1983 | Erickson | 126/9 R |
| 4,453,529 | 6/1984 | Spencer et al. | 126/25 R |
| 4,524,751 | 6/1985 | Hoglund | 126/25 A |
| 4,561,418 | 12/1985 | Cairns | 126/41 R |
| 4,582,041 | 4/1986 | Erickson | 126/25 R |
| 4,598,690 | 7/1986 | Hsu | |
| 4,619,190 | 10/1986 | Smith | |
| 4,627,410 | 12/1986 | Jung | 99/339 X |
| 4,688,543 | 8/1987 | Kopke | 126/25 A |
| 4,741,321 | 5/1988 | Squires | 126/41 R |
| 4,884,499 | 12/1989 | Rensch et al. | |
| 4,885,988 | 12/1989 | Lee | 99/449 |
| 4,924,844 | 5/1990 | Bransburg | |
| 5,313,928 | 5/1994 | Rodgers et al. | 99/449 X |
| 5,333,540 | 8/1994 | Mazzocchi | |
| 5,367,950 | 11/1994 | Sarich | |

*Primary Examiner*—Timothy F. Simone
*Attorney, Agent, or Firm*—Wenderoth, Lind & Ponack, L.L.P.

[57] ABSTRACT

A portable grill is provided in which a heat source is located laterally of food to be cooked. The grill is particularly well suited for rotisserie cooking. The portable grill of the present invention can be disassembled into a compact portable carrying structure.

5 Claims, 2 Drawing Sheets

PORTABLE GRILL

BACKGROUND OF THE INVENTION

This invention is directed to camping equipment, and more particularly to a compact portable grill for cooking foods.

Portable barbecue grills are generally well known in the art. However, most of these prior art grills provide for grill cooking, i.e., a cooking surface for supporting the food to be cooked is positioned above the heat source. However, the lower cooking source necessarily creates smoke and fumes which may permeate the food and potentially create health risks.

SUMMARY OF THE INVENTION

The present invention avoids the above-noted problems in the prior art grills by providing a suitcase-style portable grill which has a lateral side heating source. The device is a simple structure which includes upper and lower box-like members which are pivotedly connected so as to be able to pivot between a storage position and an open use or cooking position. A heating box is stored in the lower portion of the housing. The heating box is adapted to be secured on an interior surface of the upper box-like structure.

Food to be cooked is supported in front of or laterally of the heating box and over the bottom section of the housing. The food may be either cooked on a rotisserie or in a basket for supporting various pieces of food which are generally not suitable for cooking on a rotisserie. Note that since the heating box has an open top, the charcoal and lighter fluid fumes are able to escape without contacting the food, while heat permeating through a perforated the vertical sidewall of the heating box is more than adequate to cook the food.

Therefore, it is an object of the present invention to provide an improved cooking grill which can be broken down into a compact carrying case.

It is a further object of the present invention to provide a portable grill structure which provides cleaner, more healthful cooking.

BRIEF DESCRIPTION OF THE DRAWINGS

The above and other objects of the present invention will become more readily apparent with reference to the following detailed description of an embodiment of the present invention, together with the accompanying drawings in which.

DETAILED DESCRIPTION OF THE INVENTION

Figure 1:
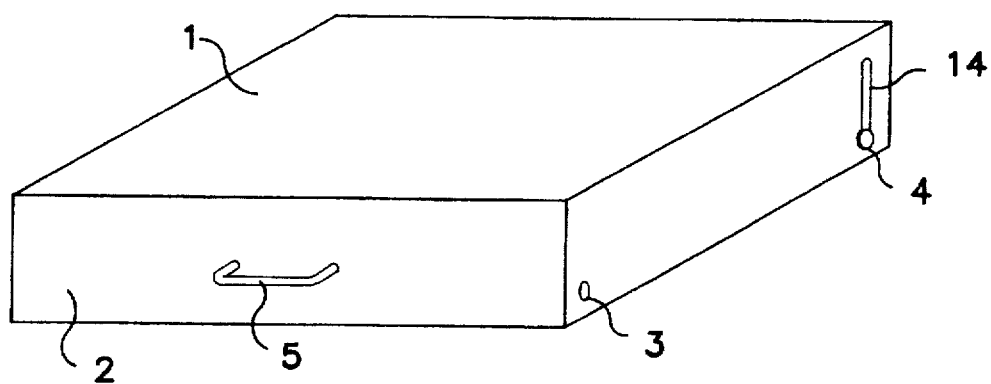
FIG. 1 is a perspective view of a portable grill structure in accordance with the present invention.
Figure 3:
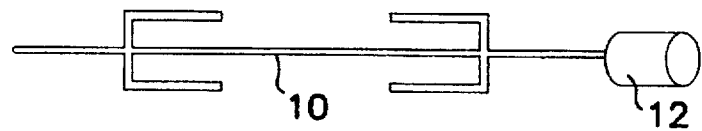
FIG. 3 is a perspective view of an exemplary cooking accessory used in the cooking grill shown in FIG. 2.

FIG. 1 is a perspective view of the present invention which shows a portable grill in a closed, storage or transporting position. In the closed position, an upper cover unit 1 overlies a lower or base unit 2. A handle 5 is provided on a side wall portion of base unit 2.

Figure 2:
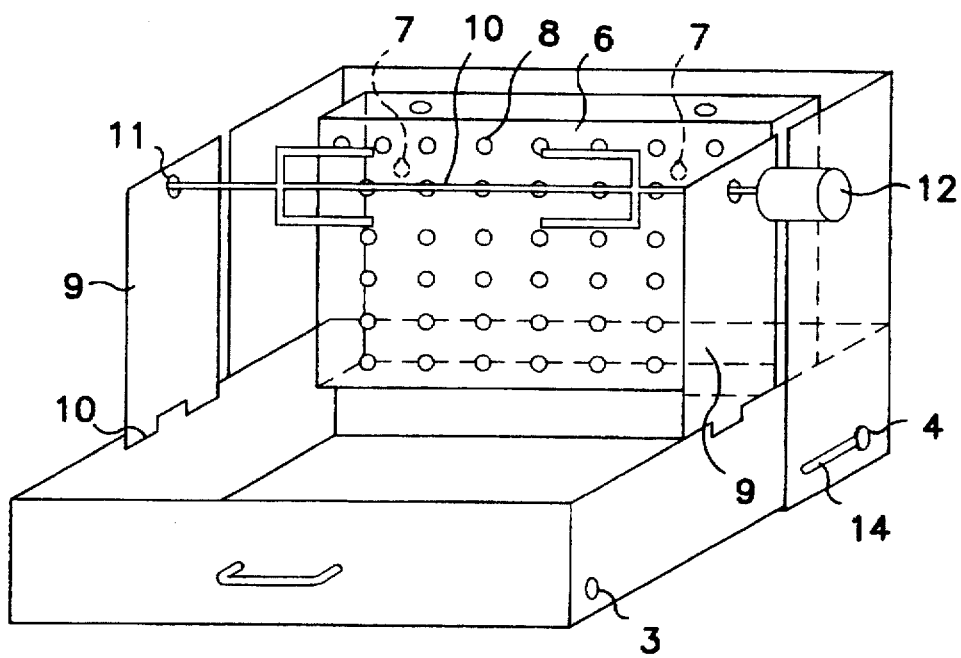
FIG. 2 is a perspective view of the portable grill of the present invention shown in an open cooking position.

FIG. 2 illustrates the portable grill of the present invention in an open, use or cooking position. In the cooking position, the cover unit 1 is pivoted into an upright or vertical orientation relative to base unit 2. The cover unit 1 pivots about a pivot element 4 which extends from a side wall portion of base unit 2. Upon pivoting the cover unit 1 through an angle of 90 degrees, the cover unit 1 is then slid horizontally toward the handle portion of base unit 2. A slot 14 is provided in a side wall portion of upper unit 1.

In FIG. 2, a cooking box 6 for holding a heat source is shown mounted on an interior wall of cover unit 1. The cooking box 6 may be secured to the cover unit 1 by any suitable means, such as a projection with an enlarged head, which is secured to the upper unit 1 and received in apertures 7. The apertures 7 are formed in a rear wall of the cooking box and are each configured to receive one of the projections.

A vertical planar side of the cooking box is provided with a series of perforations or apertures 8. The apertures 8 are sufficient to allow adequate heat to radiate from the side of heat box 6 and cook food which is positioned adjacent the perforated side.

Removable side wall panels or support structures 9 are provided to concentrate the heat in a cooking zone and to support food to be cooked by the heat radiating from heating box 6. In the embodiment illustrated in FIG. 2, a rotisserie 10 extends through support holes 11 provided in each of the removal side wall panels 9. The rotisserie may include a battery operated motor 12 secured to the rotisserie and side wall panel in any suitable fashion. The motor operates to rotate food secured on the rotisserie in the cooking zone located adjacent heating box 6.

The removable heating panels 9 are shown with a lower portion which is configured to receive an upper edge of side wall panels of the base unit 2. Flange portions 10 are seated on the upper edge, while an intermediate portion located between the flange portions 10 engages an outer surface of the side wall panels of base unit 2. Note that the illustrated means for securing or supporting the side wall panels on the base unit 2 are exemplary only and many other securing arrangements can be employed. Also, the removable panels can be modified to receive the rotisserie at different levels or to receive other structures for supporting food in the cooking zone. In particular, food which is not suitable for cooking on a rotisserie, such as shrimp or fish fillets, can be enclosed in a well known cooking basket. The basket can be supported so that one side is exposed to the heat radiating from heating box 6. The basket would then be turned at an appropriate time to expose the other side of the basket to the heat radiating from heating box 6.

A drip pan (not shown) can be provided in base unit 2 in order to catch drippings from the food which is being cooked. Upon completion of a cooking operation, the portable grill is then easily disassembled by removing support panels 9 from base unit 2 and removing the heating box 6 from cover unit 1 by disengaging the heating box 6 from its support position on cover unit 1. These items are then neatly stored in the interior of the base unit 2 along with any other accessory items. The cover unit 1 is then slid horizontally away from base unit 2 until the projections 4 engage an end of the respective slots 14. From this position the cover unit 1 is pivoted toward base unit 2 so as to be received thereon. In this position the cover unit 1 is secured on base unit 2 by any suitable means such as a projection 3 provided on the base unit 2 and a corresponding aperture or recess provided on the cover unit 1. However, other suitable fastening arrangements such as latches can be employed to secure the cover unit 1 to base unit 2.

Certain modifications to the grill of the present invention as described and illustrated will be apparent to those skilled in the art and such changes may be made in form and detail without departing from the spirit and scope of the present invention.

What is claimed is:

1. A portable grill comprising:
   a base unit including a first pair of opposing sidewall members, a second pair of opposing sidewall members, and a first planar member interconnecting said sidewall members;
   a cover unit pivotally connected to said base unit, said cover unit having a plurality of sidewall members and a second planar member interconnecting said sidewall members, wherein said cover unit is pivotable relative to said base unit between a storage position in which said second planar member overlies said first planar member and a cooking position in which said second planar member is substantially perpendicular to said first planar member;
   a heating box for receiving a heat source, said heating box being detachably connected to said planar member of said cover unit in said cooking position, and said heating box having an open upper end and a perforated sidewall; and
   a pair of detachable support structures mounted on said first pair of opposing sidewall members, respectively, in said cooking position, wherein said pair of support structures are adapted to support a food supporting device laterally of said perforated inner wall of said heating box.

2. The portable grill as claimed in claim 1, further comprising:
   a pivot pin secured to a sidewall of said base unit; and
   a slot formed in one of said sidewalls of said cover unit, wherein said slot is located so that said pivot pin is received in said slot to permit pivotal movement of said second planar member into said cooking position and lateral movement of said second planar member toward said base unit when in said cooking position.

3. The portable grill as claimed in claim 1, wherein each of said pair of support structures include a perforation for receiving an end of a rotisserie.

4. The portable grill as claimed in claim 1, wherein said base section is of a sufficient size to receive therein said cooking box when detached from said cover unit, and said support structures when detached from said first pair of opposing sidewall members.

5. The portable grill as claimed in claim 1, further comprising a securing means for securing said cover unit to said base section in said storage position; and
   a handle secured to one of said sidewalls of said base section to facilitate carrying of said portable grill.

* * * * *